M. Pinner.
Collar & Bosom.
N° 58673        Patented Oct. 9, 1866.
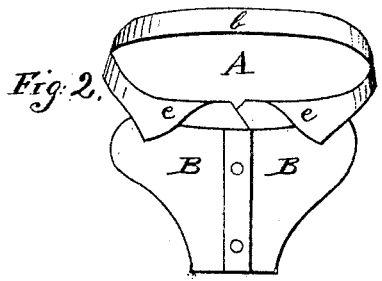
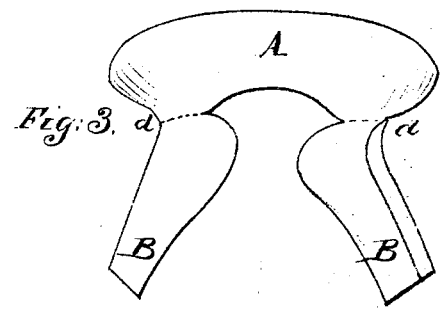
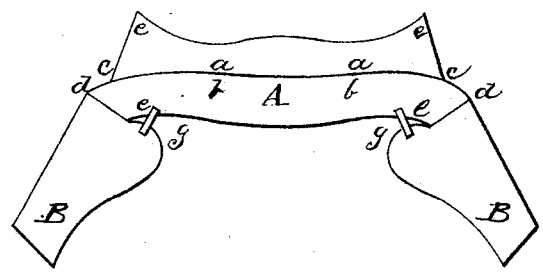
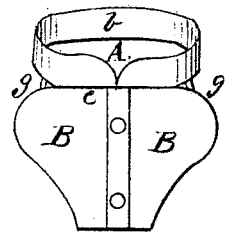
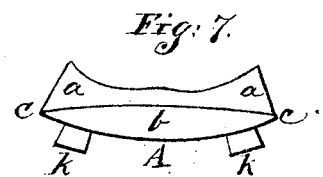
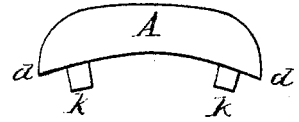
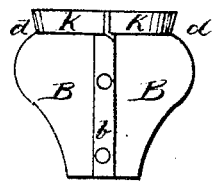
Witnesses:
Inventor:
Moritz Pinner

UNITED STATES PATENT OFFICE.

MORITZ PINNER, OF NEW YORK, N. Y.

IMPROVEMENT IN PAPER COLLARS AND BOSOMS.

Specification forming part of Letters Patent No. 58,673, dated October 9, 1866.

*To all whom it may concern:*

Be it known that I, MORITZ PINNER, of the city of New York, in the county and State of New York, have invented a new and Improved Article of Wearing Apparel, made in whole or in part of paper, which article is intended to be used as a substitute for both a shirt-collar and a shirt-bosom whenever such collar and bosom are worn at one and the same time by the same party, and are equally made in whole or in part of paper.

My invention, on account of its cheapness and simplicity, is also intended to save the wearing of white shirts whenever such are only worn to make a show similar to the one produced by the wearing of my invention.

To enable others skilled in the art to make and use my invention, I hereby declare that the following is a full and exact description thereof, reference being had to the accompanying drawings, and to the letters marked thereon.

Like letters denote like parts in all the figures.

Figure 1 in its outer lines represents one of the many shapes in which my invention or article can be cut. In this case it is cut in one piece, following these outer lines, and is cut so that that part of it which (when this article is finished) is to resemble a shirt-collar is at the same time to be an imitation of a so-called "turn-down collar" or "Shakspeare." The slit $l$ is cut by the same or a succeeding operation.

Fig. 2 represents the very same article (of Fig. 1) already turned, rounded, embossed, and fastened in the front.

Supposing the material to have been suitably prepared before the article is being cut, the cutting, embossing, and finishing of the article is an exceedingly simple and cheap process.

The cutting can be done with a variety of kinds of cutting-tools; but properly-shaped dies (used, as in envelope-cutting, in a press) will probably be found the most expeditious and the cheapest tools for cutting; and whenever the dies do not properly cut the incision or slit $l$, such incision can be cut by perpendicularly-working knives running through a table, as in scroll-cutting, or otherwise.

The turning, rounding, bending, embossing, and punching of button-holes can also be done in any of the known manners by machinery or hand.

For the sake of an easier reference, I will in this description divide my article into two parts—viz., a so-called "collar part," A, and a so-called "bosom part," B. The upper half, $a$, of the part A in Fig. 1 is turned smoothly over the lower half, $b$, on the line $c$. After this the parts B are for a moment bent closely over the part A on the line $d$. After this, again, the strips $g$ are put on across the incision or slit $l$, so as to connect the parts A and B. These strips $g$ can be made of any desirable size and shape, and of any suitable material, and can be put on in various ways; but a material that is sticky will be found most suitable for the purpose and quickest applied. The rounding of the article is done by simply pulling together the two parts B near the line $d$.

Imitations of one of a variety of figures or plaits that can be embossed on the bosom part B or on the collar part A are in part denoted in the drawings by the letter $f$.

Fig. 3 represents the outside lines of another one of the many shapes in which my article may be cut. This is also made in one piece, and its collar part A is made in imitation of one of the so-called "stand-up" collars. This kind is still easier to make than that of Fig. 1 and Fig. 2, for it saves the folding or turning down on line $c$, and only needs to be bent on line $d$, as in Fig. 1.

Fig. 4 represents the article of Fig. 3 already embossed, bent on line $d$, supplied with the strips $g$, rounded, and ready for the wearer.

In practice, I find it cheaper and more expeditious to cut my article in one piece; but to imitate certain fashions of collars and bosoms it can also be cut advantageously in more pieces. When it is intended to cut it in several pieces instead of one, I cut either the collar part A, as in Figs. 6 and 7, or the bosom part B, as in Fig. 5, or both of these parts, with projecting pieces K, and by gluing, pasting, folding, or pressing these projecting pieces K on or into the part with which a connection is to be formed, the parts A and B can be combined without spoiling the appearance or serviceability of the article; and were it not for the useless labor and expense, I could also produce my article fully strong and adjustable enough by cutting the parts A and B in separate pieces (without the projecting parts K) in such a form as to fit together somewhere near the line $d$ and the slit $l$, and I could then combine these parts A and B by one or more strips, $g$, of a textile fabric cut in any desirable size and shape, and put on just loose enough to retain the full pliability of the bosom part B.

My invention is adaptable to men's, women's, youths', misses', and children's wear by varying the form and size of its parts; and it can also be made to imitate and follow the varying fashions of collars and bosoms by varying the cut, style of embossing or printing, or the color of the whole or any of its parts. In determining any of these variations and modifications of my article I am simply guided in each case by the purpose and market for which I want to use it, and by the particular appearance the article to be produced is desired to have.

I am aware that shirt-collars and shirt-bosoms have been made in whole or in part of paper; but my invention is neither a shirt-collar nor a shirt-bosom, for it is not suitable to be worn in the place of either one of these articles when separated from the other; and it also differs from these articles in this, that it requires but one adjustment to the neck of the wearer, while a separately-manufactured collar and a separately-manufactured bosom, though worn at the same time and by the same party, require in the aggregate two adjustments.

My invention is also no combination of collars and bosoms, partly for the reasons just stated, and partly also because these two articles, after having been made so that each of them can properly serve as a marketable and wearable article independent of the other, will, when thereupon combined before being put on by the wearer, not produce the well-fitting, wearable, or salable article which I produce. Thus my invention in reality constitutes a substitute for a shirt-collar and a shirt-bosom when such collar and such bosom are worn by the same party at one and the same time.

I am also aware that bindings, bands, loops, and other devices have been made and attached to paper collars and paper bosoms for the purpose of fastening these latter to the shirt or other garment worn underneath, or for holding such collars or bosoms in their respective places while worn; but these do not combine a collar with a bosom before adjustment to the neck, but fasten merely a band to a collar or to a bosom; nor do they constitute a substitute for such collar and such bosom at one and the same time.

I am further aware of the invention of gluing or pasting a paper shirt-collar to a paper shirt-bosom, and vice versa, and the whole so arranged as to fasten in the rear of the neck; but this invention is neither practical nor salable. Whether cut in one or more parts it lacks the incision $l$, which I cut into my article to give it pliability and adjustability over the collar-bone of the wearer, and without this pliability the stiff material used would pucker or corrugate near the place where in my invention I fasten the strips $g$, and thus the whole would be forced out of its intended position and become unsightly; and cutting an article (as the one just described) so as to be adjustable in the rear of the neck makes it also inconvenient to adjust and wear, and therefore less practical and salable in the end.

And, lastly, I am also aware that attempts have been made to cut a substitute for collars and bosoms in some respects similar to the manner in which I cut mine—that is to say, in one piece and adjustable in front. In that invention, in a place somewhere, where I in mine fasten the strips $g$, a piece is cut out between the bosom part B and the collar part A, so as to lessen somewhat the above-described pucker and corrugation and to hide under the waistcoat or collar the upper protruding ends of the bosom part B; but in that invention, in consequence of the stiffness of the material, a perfect or even easy self-adjustability of the bosom part over the collar-bone remains unobtained in spite of the vacant space thus cut and left between the collar part and the bosom part. That vacant space dare not be cut too close to the buttoning or adjusting part in front, lest in the first attempt to use the article the material thus weakened will in consequence of its stiffness break across and separate the bosom part B from the collar part A altogether or sufficiently so to spoil the article for its intended purpose. That invention also makes its protruding upper end of the bosom part B during many of the ordinary motions of the body liable to leave their hiding-place, and annoyingly and in an unsightly manner stick out of or rest upon the vest-coat or collar instead of under them, and through the vacant space left between the collar part and the bosom part (in many of the varieties of collars or bosoms likely to be imitated) the garment worn underneath is also annoyingly and unintentionally seen. In fine, that invention lacks most of the principal characteristics necessary to make it convenient to wear or profitable to sell, to wit: It lacks a perfect self-adjustability of the bosom part B over the collar-bone and chest of the wearer; it lacks the means for preventing the parts A and B from being torn apart easily in wearing or in attempting to wear the article; and it also lacks the means of hiding for sure the protruding upper ends of the bosom part B as well as the garment worn underneath; and all these important characteristics my invention possesses.

I secure a perfect self-adjustability of the bosom part B over the collar-bone and chest of the wearer by means of the bend on the line $d$ in connection with the slit $l$, and the position of that line $d$ can be higher up or lower down and its direction more or less oblique, to fit the better over the various heights of collar-bones. In like manner, and by my strips $g$, do I secure the means to prevent the parts A and B from being easily torn or broken apart even if the slit *l* were extended to within half an inch of the front button-holes.

And, lastly, by these very strips *g*, I also secure the means of sufficiently forcing into a position under the waistcoat or collar the otherwise protruding upper ends of the bosom part B, and by these very same means and at the same time I also hide the garment worn underneath.

Having thus fully described the mode and manner of making and using my article, I claim as my invention and desire to secure by Letters Patent—

1. A substitute for a shirt-collar and a shirt-bosom, such substitute being made in whole or in part of paper, cut in one or more pieces, and made to fit or adjust itself around the neck and over the collar-bone and chest of the wearer, substantially by the means and in the manner herein set forth and described.

2. Combining the collar part A with the bosom part B of the above invention by means of one or more strips, *g*, for the purpose of strengthening, connecting, or holding in place such parts A and B, or either of them, all substantially as herein set forth and described.

3. Bending, creasing, or indenting on line *d* the product embraced in the above invention, for the purpose herein set forth and described.

4. Making the above-described article open and adjustable on any side or part of the neck of the wearer.

5. Printing on and embossing the above-described article, or the material of which it is made in whole or in part, all substantially as herein set forth, and for the purposes specified.

MORITZ PINNER.

Witnesses:
  C. M. NORTHRUP,
  HENRY K. GATES.